(12) United States Patent
Perten et al.

(10) Patent No.: US 8,284,066 B2
(45) Date of Patent: *Oct. 9, 2012

(54) CONTAINER POWER SENSING SYSTEM AND METHOD

(75) Inventors: Herbert Perten, Suffern, NY (US); Timothy Slifkin, Morristown, NJ (US); Thomas A. Robinson, Mendham, NJ (US); Swati Chiney, Rutherford, NJ (US)

(73) Assignee: Startrak Information Technologies, LLC, Fort Lee, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,027

(22) Filed: Oct. 5, 2010

(65) Prior Publication Data

US 2011/0254690 A1    Oct. 20, 2011

Related U.S. Application Data

(63) Continuation of application No. 12/049,999, filed on Mar. 17, 2008, now Pat. No. 7,812,733.

(51) Int. Cl.
*G08B 21/00*    (2006.01)

(52) U.S. Cl. .......... 340/635; 340/654; 340/585; 236/51; 324/102; 62/240

(58) Field of Classification Search .................. 340/585, 340/635, 654; 236/51; 324/102; 62/240
See application file for complete search history.

(56) References Cited

U.S. PATENT DOCUMENTS

| | | | | |
|---|---|---|---|---|
| 3,480,940 A | * | 11/1969 | Lieser | 340/530 |
| 3,573,614 A | * | 4/1971 | Wittbrodt | 324/102 |
| 5,059,945 A | * | 10/1991 | Scheele et al. | 340/426.18 |
| 6,863,222 B2 | * | 3/2005 | Slifkin et al. | 236/51 |
| 2004/0145520 A1 | * | 7/2004 | Richardson et al. | 342/357.07 |

* cited by examiner

*Primary Examiner* — Jennifer Mehmood
*Assistant Examiner* — Mark Rushing
(74) *Attorney, Agent, or Firm* — Drinker Biddle & Reath LLP

(57) ABSTRACT

An automated and/or remote method for identifying and/or changing the source of power for these generator sets, which may apply to any environment where there are alternative sources of power available which must be managed remotely (such as for other powered containers not used for refrigeration transport).

19 Claims, 8 Drawing Sheets

US 8,284,066 B2

CONTAINER POWER SENSING SYSTEM AND METHOD

RELATED APPLICATIONS

This is a Continuation of U.S. application Ser. No. 12/049,999 filed Mar. 17, 2008 now U.S. Pat. No. 7,812,733. This application is related to U.S. Application Ser. No. 60/895,435 filed 16 Mar. 2007, U.S. Application Ser. No. 60/895,105 filed 15 Mar. 2007, U.S. Application Ser. No. 60/895,081, filed 15 Mar. 2007, and U.S. Application Ser. No. 60/914,783 filed 30 Apr. 2007. Applicant claims the benefit of the filing of each of these applications.

FIELD OF THE INVENTION

This invention relates to sensing and controlling regulating systems such as refrigeration systems in shipping containers.

BACKGROUND OF THE INVENTION

Shipping containers are typically used to transport products on ocean going transport ships. A refrigerated container is a special type of container, which incorporates a refrigeration unit (typically installed in the front 18" of the container) which is used to keep the contents at an assigned temperature. This temperature may be set at any point within a wide range (i.e. −10 F to 60 F). (In actual use, refrigeration containers are sometimes used to "heat" a product such as to prevent sensitive cargos from freezing during transport through cold climates. In any case, these are still referred to as "refrigerated containers"). The refrigerated container incorporates the refrigeration unit itself, but typically must be powered by an external source.

On board ship, this power is usually provided by the shipboard power network which is connected to the container via a heavy-duty power cable attached to the container. Once the container is taken off the ship at a port, electrical plug power is usually available to power the container in the port. Once the container is placed on a "chassis" (a trailer structure pulled behind a truck used to deliver the container from the port to its final destination), power is normally provided by a generator set ("genset") which is temporarily bolted to either the container itself or the chassis. A genset is a large assembly typically consisting of: a diesel engine, an AC alternator (to provide power), and a fuel tank and it is designed to power the container when it moves on land. The power cable connects the container to the genset.

Often, a container is taken from the ship and held in temporary storage within a yard facility (intermodal yard). Likewise, a refrigerated container is held in temporary storage at a customer or shipper's facility until it is time to transport the container to its final destination. During these periods of temporary storage, power must be provided to the container to allow the refrigeration unit to run and keep the contents at the appropriate temperature. Often, the genset is simply left on to power the refrigeration container, even though these facilities have electrical power outlets available to power stationary containers. It is generally less expensive to utilize this local (or "shore") power when available rather than to continually run the genset (which consumes diesel fuel).

Operationally, it often occurs that refrigerated containers are inadvertently left running on the diesel generators even while parked in temporary storage within useable distance of a shore power outlet. Thus, the operator is not utilizing the most efficient power source available.

SUMMARY OF THE INVENTION

One aspect of the invention furnishes an automated and/or remote method for identifying and/or changing the source of power for these generator sets. However, the same may apply to any environment where there are alternative sources of power available which must be managed remotely (such as for other powered containers not used for refrigeration transport).

Another aspect of the invention involves determining, via reading one or more of the following settings such as voltage, current, power, temperature, etc., whether a refrigerated container, is 1) currently switched on and drawing power; 2) is connected to either (a) a genset or (b) port shore or container ship electrical power. The invention may include the ability to determine the electrical variations between genset power, shipboard power, and shore electrical power.

Yet another aspect of the invention, involves a switch, mounted on the container, which an operator may use to indicate whether the container is using genset power or another source of power. The purpose of the switch is to 1) identify the source of the power; 2) change the source of the power by manipulation of the local switch; 3) change the source of the power by manipulation of remote control (via computer, cell phone, or other such remote device); 3) notify the appropriate party(ies) of the condition; the notification and/or remote control to be made via a wired or wireless communications system connected to the container or the power source itself

DETAILED DESCRIPTION OF PREFERRED EMBODIMENTS

Figure 1:
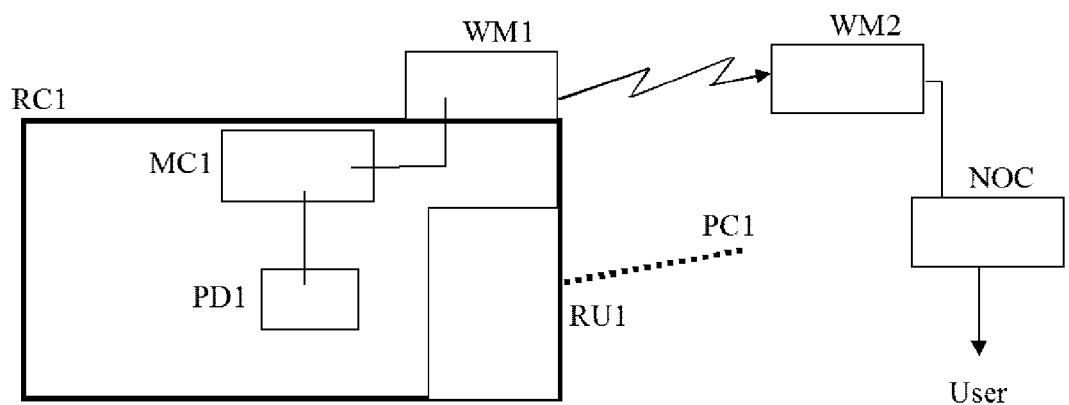
FIG. 1 is a block diagram illustrating an embodiment of the invention.

In the embodiment of FIG. 1, a refrigeration unit RU1 in a reefer container RC1 receives 3 phase electrical power via a power cable PC1, which in turn may be connected either to a genset or to shore power. A power detection module PD1 identifies the power source and sends this information to a microcontroller MC1. This information is formatted into a message and sent over a wireless link by a wireless module WM1. A wireless module WM2 receives the information and conveys it to a network operations center NOC for utilization by a user.

Figure 2:
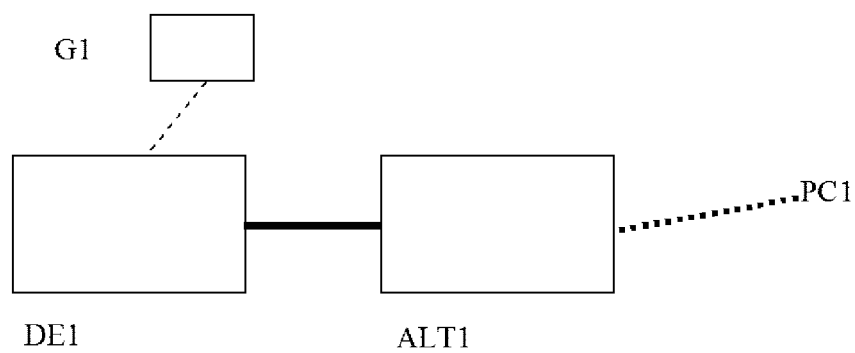
FIG. 2 is a block diagram illustrating a genset.

A typical genset GS1 appears in FIG. 2. Here, a diesel engine DE1 drives a 3-phase alternator ALT1. A governor GO1 maintains engine speed over a range of expected loads. In response to a change in load, the governor GO1 adjusts the operating parameters of the diesel engine DE1 to maintain proper rotational speed. Typically, an additional load will cause a transient drop in engine speed, while the reduction in load will cause a transient increase in speed.

The power source detection module PD1 detects the power source that the power cable PC1 connects to the reefer container RC1. The module may operate on an analog or digital basis. It exploits the fact that the incremental load that the addition of one reefer container RC1 presents to an electrical utility is insignificant, while the incremental load that a reefer container RC1 presents to a genset GS1 is significant. When power to the reefer container RC1 turns on, the transient load of the reefer container causes the genset GS1 to instantaneously slow down, until its speed governor GO1 gets it back to normal speed. When power to the reefer container RC1 turns off, the genset GS1 will instantaneously speed up until its governor gets it back to its nominal speed. The power source detection module PD1 monitors the frequency of the AC power to the reefer container RC1. If short term frequency deviations exceed a given threshold, the detection module PD1 interprets this to mean that the reefer is being powered by a genset GS1. In an embodiment of the invention, the power source detection monitor PD1 is enabled immediately after the reefer is powered up. Typically, the microprocessor MC1 controlling the refrigeration unit RU1 delays turning on the refrigeration unit for several seconds after first getting powered up, which gives the detection circuitry time to be enabled. Once the power source has been ascertained, it is no longer necessary to monitor the AC power, because the power source cannot be changed without temporarily interrupting the power supply, which is detected and used to re-initialize the system.

Figure 3:
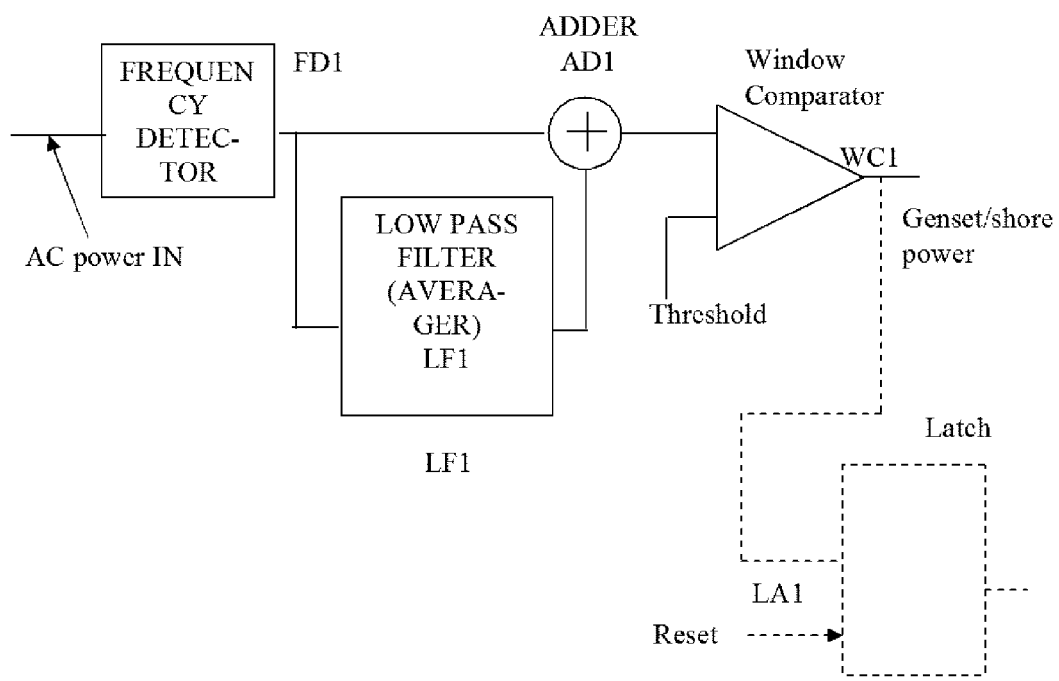
FIG. 3 is block diagram of an analog embodiment of the power source detection module.

A block diagram of an analog embodiment of the power source detection module appears in FIG. 3. This module detects genset power by observing frequency transients when power is applied. This occurs when the genset slows down due to transient increased load and takes some time to recover to its governed speed. In FIG. 3, a frequency detector FD1 senses the frequency of the incoming power and produces a measurable value such as a voltage that corresponds to the frequency. A low pass filter LF1 averages the value of the frequency over time. An adding circuit AD1 subtracts the average value from the sensed value of the incoming frequency so that only indications of changes or transients in the value of the incoming frequency remain at the output of the adding circuit. A window comparator WC1 compares the changes or transients in the value of the frequency with a threshold value and passes only the significant transients that exceed the threshold value, so as to eliminate minor insignificant and noise. An output at the window comparator WC1 denotes one or more significant transients, and hence that the power source is a genset. This is so because the incremental load that a reefer container RC1 presents to a genset GS1 is significant and results in significant frequency transients. A latch LA1 latches the output of the window comparator WC1 so that the result at the window comparator remains available at the output of the latch even after transients have disappeared.

According to an embodiment of the invention the processes of this type are implemented digitally be preceding the frequency detection section with an analog-to-digital converter. Combinations of the two are used according to an embodiment of the invention.

Because of the significant difference in cost between shore power and genset (diesel) power, most operators would be interested in minimizing the use of diesel gensets when shore power is available. Embodiments of the invention provide the information they need to alert field personnel to switch to the more economical power source when they have not done so in a prescribed amount of time.

Figure 4:
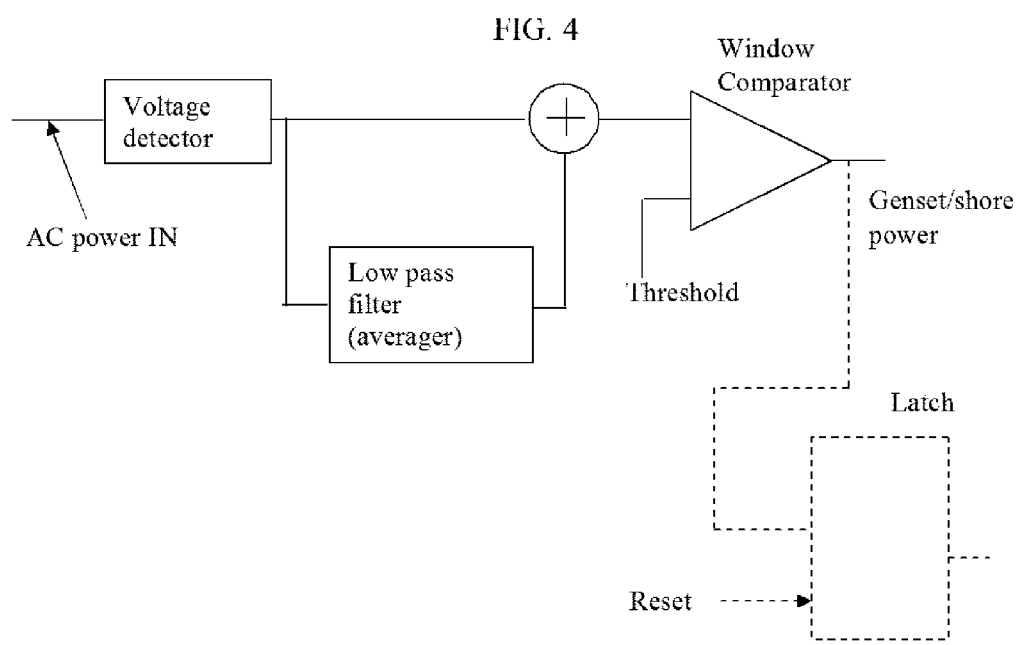
FIG. 4 shows another embodiment of a power detector.

FIG. 4 shows another embodiment of the power detector PD1. This embodiment detects genset power by observing voltage transients when power is applied. This occurs when the genset slows down due to transient increased load and takes some time to recover to its governed speed. The circuit is similar to that of FIG. 3 except that at voltage detector VD1 detects the voltage appearing at the AC power input.

Figure 5:
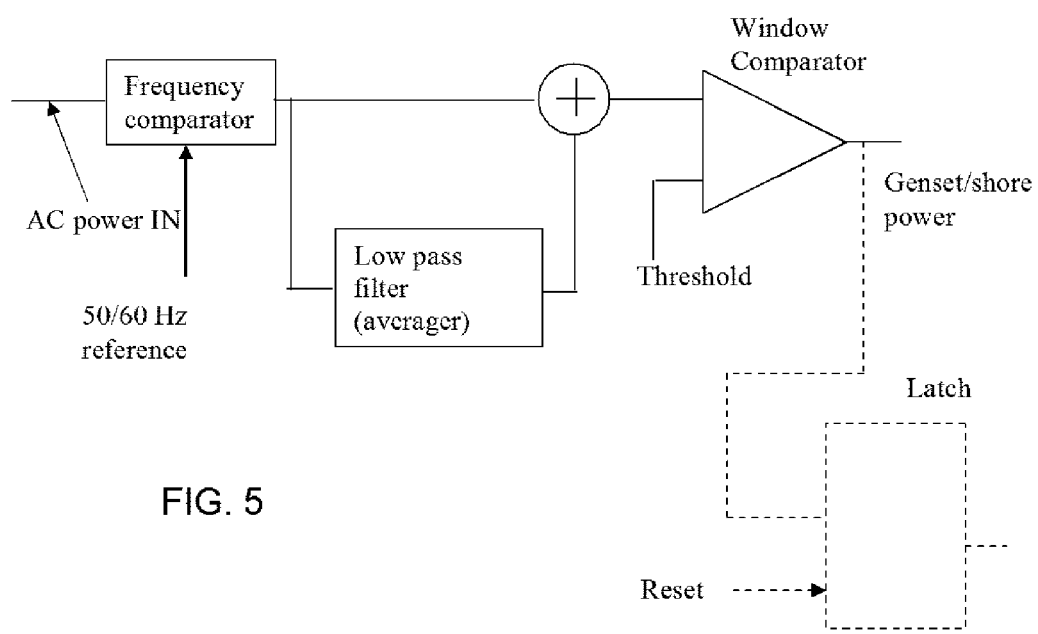
FIG. 5 shows an embodiment of the invention which detects genset power.

FIG. 5 shows an embodiment of the invention which detects genset power by observing that the applied power differs from 60 or 50 Hz in the case of all but shore power (which comes from the electric utility and is therefore very accurate in frequency). This circuit of the power detector PD1 is similar to FIG. 3 and FIG. 4. However, here instead of a frequency detector FD1 or a voltage detector VD1, the detection module PD1, in its analog or digital forms, uses a frequency comparator FC1 to compare the actual frequency of the voltage that the power cord PC1 with 60 Hz, the standard frequency of US power stations, or 50 Hertz, the standard frequency outside the US. Such standard frequency measurements indicate power sources from ordinary shore facilities. On the other hand, the detection module PD1 may sense a frequency that departs substantially from the 50 or 60 Hertz standard and this indicates a source such as a genset whose frequency depends on the rotation of the generator in the genset. The measurement distinguishes genset power from shore power. If a genset is being used in place of shore power the user can contact local controllers at the reefer site the change the power source if possible.

Embodiments of the invention use equivalent digital or software approaches or a combination of these approaches.

According to an embodiment of the invention, the operations and structure described for the power detector PD1 are performed not only in the power detector itself but are shared among any or all the elements composed of the microprocessor MC1, the wireless module WM1, wireless module WM2, and the network operations center NOC. For example, in one embodiment the power detector PD1 only senses the output of the power cable PC1 and the microprocessor digitally performs the functions the frequency detector FD1, the low pass filter LF1, the adder AD1, and the window comparator WC1. The latching function of the latch LA1 occurs in the network operations center. In another embodiment these operations are distributed differently. For purposes of brevity, the total of the detecting operations and structures in these diverse elements, instead of just in the power detector PD1, is referred to as the detector system SD1.

Figure 6:
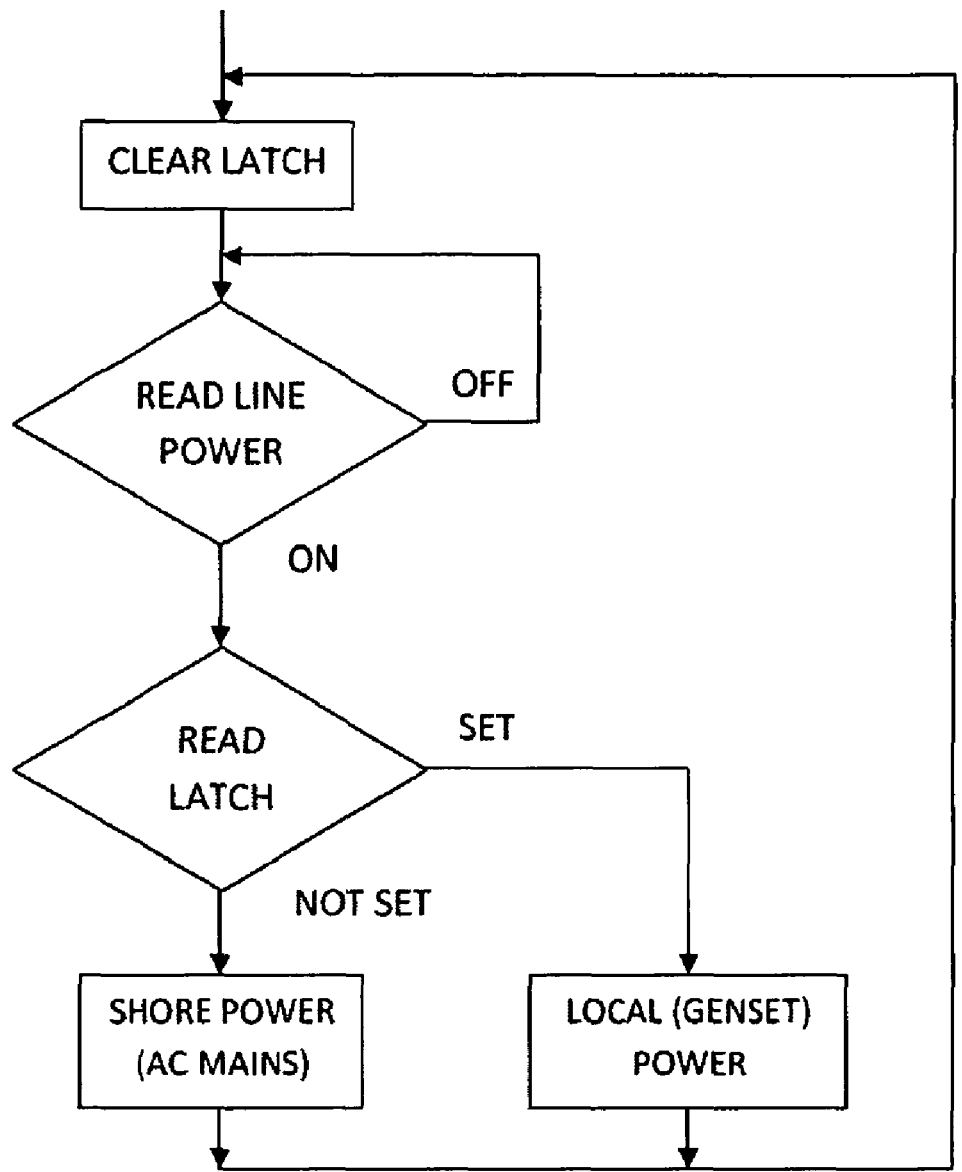
FIG. 6 is a flow chart illustrating an embodiment of a process of the invention.

According to another embodiment the detector system is arranged to turn on during expected transients and off at other times. FIG. 6 is a flow chart illustrating an embodiment of a process of the invention wherein the timing of the detector system SD1 is controlled.

Figure 7:
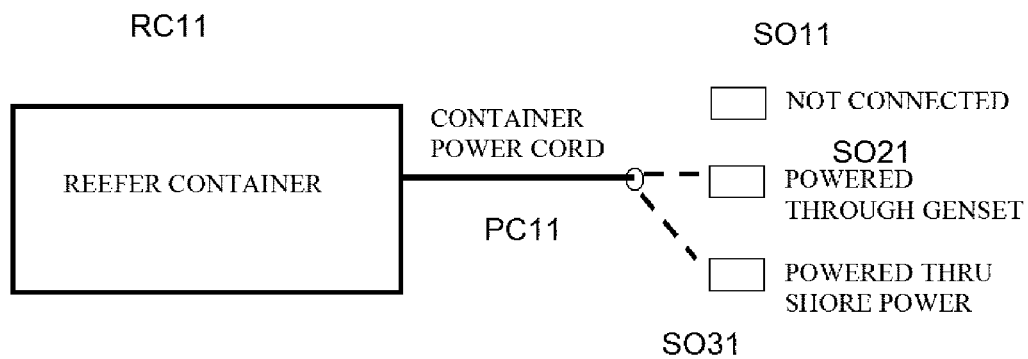
FIG. 7 is a block diagram illustrating one embodiment of the invention.

FIG. 7 illustrates another embodiment of the invention. Here, the power sensing function or operation determines the source of power SO11, SO21, or SO31 for a refrigeration container or reefer container RC11 via a container power cord PC11. This is based on voltage and/or current and/or power or other types of sensors, and an algorithm or process or hardware device that differentiates between genset power and electrical shore power (and potentially other types of power). The algorithm or process may be embedded within the wireless tracking device used for tracking containers, or within the microprocessor used for controlling the refrigeration unit, or within the microprocessor unit used for controlling the genset, or as a separate unit. Examples appear as follows:

In one example, a voltage sensor and current sensor read the voltage and the current draw by the container when powered. The system monitors these reading on a periodic basis. Based on the power source characteristics of voltage, current, frequency, power, variation limits and cycles under various load conditions, the algorithm or device monitors and distinguishes the difference between the various power sources.

This basic operation will lead to determining the source of container power with the interest in monitoring the dwell time and fuel use of the container when in a port facility and on genset power. The economic benefit of the invention is enhanced if the wireless monitoring device on the container contains knowledge that it is geographically within a port area, which has shore power. This may be identified through the use of a "geofence" or a simple gate transaction for the container.

Figure 8:
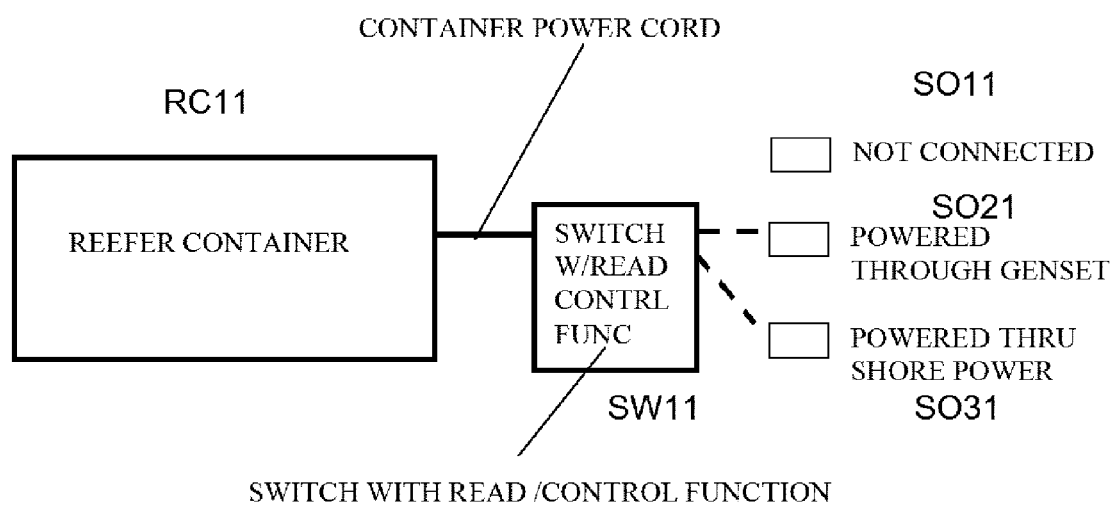
FIG. 8 is a block diagram illustrating another embodiment of the invention.

The embodiment in FIG. 8 involves reading the power source information from the container. This is achieved by creating a switch SW11 that is mounted on the container RC11 at the power cord PC1. Below are the details:

A switch SW1 is placed between the power source SO11, SO21, SO31 and the container RC11. The switch SW11 is read via the on-asset hardware on a periodic basis. A user flips the switch SW11 to connect to the proper power source as physically connected to the container RC11. Based on predetermined state of switch SW11, the on-asset algorithm distinguishes the source of power supply to the container RC11 when change happens. The power source information is used by the wireless monitoring system to convey the power source information remotely. This data retrieved from second source can also be used to validate the data retrieved from the first source as discussed with respect to FIG. 7

The power source sense algorithm: The process for the reefer (refrigeration) unit starting is as follows: The micro processor on the reefer commands the compressor and/or the condenser/evaporator fan and/or the heating coils (used for defrosting and for heating the load when necessary) and/or main circulating fan. Each of these elements puts requires power from the source. Which elements are turned on in which order determine the overall load required by the reefer unit.

If the reefer is connected to ship or shore power, many containers can be connected into the same "mains" and the load created by any one container will be minimal as a percentage of total power available. Thus, under these circumstances, when turned on, the reefer unit will come up to full performance power fairly quickly.

By contrast, if the reefer is connected to a genset (which powers only one container at a time), the reefer will draw a large percentage of the genset's available power. The net result of a significant increase in load on a diesel run generator is generally an increase in the load on the diesel engine and a resultant reduction in the RPM's of that engine. (Similar to a truck coming to a hill—the speed falls off.) To counter-act, the engine control increases fuel flow to the engine and the rpm increases. The controller continues to increase engine fuel until the rpm reaches the governor limit. At that point, the diesel engine is running at the appropriate speed, and the fuel flow stabilizes. In a motor-generator (or motor-alternator) system, the frequency of the AC power is directly proportional to the speed of the engine. This is why such engines have accurate speed governors. In a road vehicle, you step on the gas to go faster. In this application, you "step on the gas" to go the same speed but with higher load (as in up a hill).

The invention takes advantage of characteristics that are different for a genset motor generator, a ship board power generator, and a major utility power source that can be differentiated. The invention evaluates the AC power line signal characteristics (voltage, current, phase, frequency, rms value, signal linearity, etc.) In this manner, the invention accurately determines the source of power for the container by direct measurement.

In an embodiment a controller remotely forces the reefer unit RC11 into known modes of operation in order to "stress" the power source to validate the nature of the source. This process takes considerably more time than that required by a shore- or ship-powered system. Thus, each time there is a state change in the reefer operating mode, it is possible to perform this operation. Further, as the reefer demands increased power, the genset must react by automatically increasing fuel flow to the diesel engine. When the reefer starts up from a dormant condition, there is an initial load placed on the power source.

Figure 9:
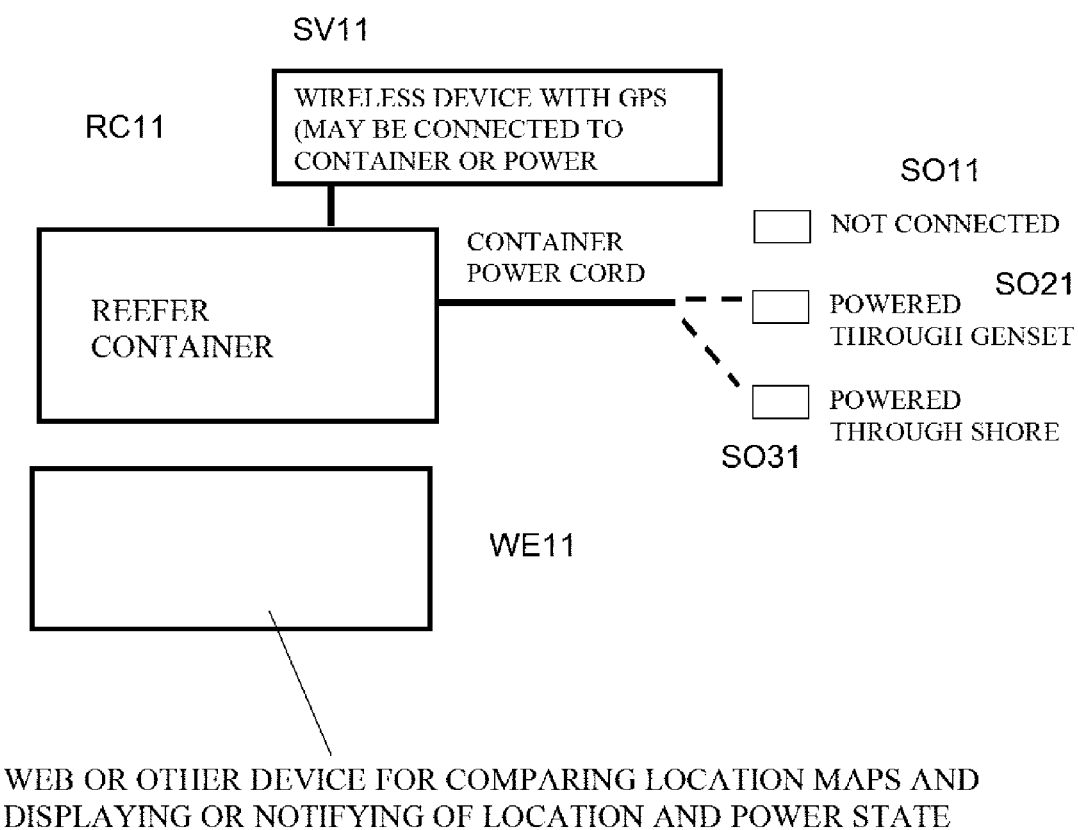
FIG. 9 is a block diagram illustrating yet another embodiment of the invention.

In the embodiment of FIG. 9, a location sensing device SV11 (such as a gps unit, RF triangulation device or some other locating device) senses the location of the container RC11 and compares that with known locations of power outlets. Location information is sent back via a wireless device WI11 or other method. Thus, the system notifies the user whether the container (which is running on genset power) is within connecting range of a shore-based power outlet. The system performs such notification via web-page screen, email, or other transmission. Thus, if a unit is known to be running on genset power, but is known to be located near a shore power outlet, the system notifies the user to switch to shore power.

The user may have the ability, via a wireless device or other method, of controlling a switch that changes the source of power from shore power to genset power and back.

While embodiments of the invention have been described in detail, it will be evident to those skilled in the art that the invention may be embodied otherwise.

What is claimed is:

1. A shipping container, comprising:
   a refrigeration unit;
   a power line connected to the refrigeration unit;
   said power line being connectable to one of a utility power source or a shipboard power source subject to limited transients in response to refrigeration unit load changes on the one hand and an engine driven genset subject to higher transients in response to refrigeration load changes on the other;
   an electrical transient sensor connected to the power line of the container and having an output revealing the existence of a transient, and
   a two-condition threshold indicator switch responsive to the output of the transient sensor;
   said threshold indicator switch exhibiting one of two conditions;
   one of said conditions indicating a transient beyond a threshold as a demonstration that the power line is connected to the genset; and
   a threshold-exceeding transient condition transmitter.

2. A system as in claim 1, wherein said sensor includes:
   An electrical condition detector connected to the output line, said electrical condition detector including one of voltage, current, phase, frequency, rms value, and signal linearity.

3. A system as in claim 1, wherein said sensor includes a digitally formatting microprocessor connected to one of said transient detector, said switch, and said transmitter.

4. A system as in claim 1, wherein said transient sensor includes:
   a electrical onset or electrical change detector; and a refrigeration unit power delay between said refrigeration unit and said detector;
said detector being coupled directly to said threshold indicator.

5. A system as in claim 1, wherein said electrical transient sensor includes:
an electrical frequency detector or voltage detector at the power line;
an averaging arrangement responsive to said detector;
a subtracting arrangement responsive to the averaging arrangement and said detector;
a comparator responsive to said subtracting arrangement and to a threshold; and
wherein said transmitter includes an alarm signal.

6. A system as in claim 1, wherein said electrical transient sensor includes:
an electrical frequency detector or voltage detector at the power line;
an averaging arrangement responsive to said detector;
a subtracting arrangement responsive to the averaging arrangement and said detector;
a threshold-exceeding-indicating comparator responsive to said subtracting arrangement and to a threshold; and
a latch responsive to said comparator; and
wherein said transmitter includes an alarm signal.

7. A system as in claim 1, wherein said electrical transient sensor includes:
an electrical frequency detector or voltage detector at the power line;
a fifty Hertz or sixty Hertz frequency input;
a subtracting arrangement responsive to the fifty Hertz or sixty Hertz frequency input and said detector;
a comparator responsive to said subtracting arrangement and to a threshold; and
wherein said transmitter includes an alarm signal.

8. A system as in claim 1 wherein said transient sensor includes:
a power-source-stressing refrigeration-unit interrupter coupled to said refrigeration unit.

9. A method of selecting power for a refrigeration unit in a shipping container, comprising:
monitoring electrical conditions of power energizing the unit;
sensing transients in the monitored electrical conditions;
comparing the value of the transients to a threshold; and
transmitting a signal indicative of whether or not a transient exceeds the threshold to a user as an indication of the power line being connected to an engine driven genset subject to higher transients in response to refrigeration load changes on the one hand or a utility power source or a shipboard power source subject to limited transients in response to refrigeration unit load changes on the other hand; and
shifting the power from a genset, if the unit is being powered by a genset, to a utility power source or a shipboard power source.

10. A method as in claim 9, wherein said sensing step includes sensing transient variations in frequency in the monitored electrical conditions.

11. A method as in claim 9, wherein said monitoring step includes digitally formatting the frequency signal in a microprocessor.

12. A method as in claim 9, wherein said monitoring step includes detecting an onset of power from the power line and starting the sensing step while delaying the application of power to the refrigeration unit so as to allow incoming power on the line to operate at a no-load condition during the delay and to load the power source after the delay and produce a transient in response to the change from no-load to load.

13. A method as in claim 9, wherein said monitoring step includes:
detecting an onset of power from the power line and starting the sensing step while delaying the application of power to the refrigeration unit so as to allow incoming power on the line to operate at a no-load condition during the delay and to load the power source after the delay and produce a transient in response to the change from no-load to load, and
wherein said sensing step includes sensing the transient in one of frequency and voltage arising from a genset generator slowing down in response to the change from no-load to load.

14. A method as in claim 9, wherein said monitoring step includes:
detecting the electrical frequency or voltage at the power line to produce a detector signal representing the frequency;
wherein said step of sensing transients includes:
averaging the detector signal to produce an averaged signal; and
subtracting the averaged signal from the detector signal at the power line to produce a transient signal; and
wherein the step of comparing includes:
comparing the transient signal with the threshold to produce a comparison signal indicative of whether or not the power line is connected to a genset; and
wherein the step of transmitting the signal indicative of a transient exceeding the threshold to a user includes:
transmitting an alarm to advise personnel of the condition.

15. A method as in claim 9, wherein said monitoring step includes:
detecting the electrical frequency or voltage at the power line to produce a detector signal representing the frequency or voltage;
wherein said step of sensing transients includes:
averaging the detector signal to produce an averaged signal; and
subtracting the averaged signal from the detector signal to produce a transient signal; and
wherein the step of comparing includes:
comparing the transient signal with the threshold to produce a comparison signal indicative of whether or not the power line is connected to a genset; and
latching the comparison signal when the comparison signal exceeds the threshold; and
wherein the step of transmitting the latched signal indicative of whether the transient exceeds the threshold to a user includes:
transmitting an alarm to advise personnel of whether the transient exceeds the threshold.

16. A method as in claim 9, wherein said monitoring step includes:
detecting the frequency at the power line to produce a detector signal representing the frequency;
wherein said step of sensing transients includes:
subtracting the detector signal representing the frequency at the power line to from the standard fifty or sixty Hertz frequency to produce a transient signal; and
wherein the step of comparing includes:
comparing the transient signal with the threshold to produce a comparison signal indicative of whether or not the power line is connected to a genset.

17. A method as in claim 9, wherein at least portions said delivering step is carried out in the shipping container or off the shipping container at a network operations center.

18. A method as in claim 9, wherein said sensing step includes sensing one of voltage, current, phase, frequency, rms value, and signal linearity of said power line.

19. A method as in claim 9 wherein said monitoring step includes remotely forcing the refrigeration unit into another mode of operation in order to stress the power source.

* * * * *